United States Patent [19]

Jordan

[11] 4,013,454
[45] Mar. 22, 1977

[54] COPRODUCTION OF IRON WITH METHANOL AND AMMONIA

[76] Inventor: Robert Kenneth Jordan, Carlton House, Suite 1431, 550 Grant St., Pittsburgh, Pa. 15219

[22] Filed: Mar. 4, 1975

[21] Appl. No.: 555,159

[52] U.S. Cl. .............................. 75/41; 260/449.5; 423/359
[51] Int. Cl.² ...................... C21B 5/00; C21B 3/04
[58] Field of Search .............. 75/41, 42; 260/449.5; 423/359

[56] References Cited
UNITED STATES PATENTS

| | | | |
|---|---|---|---|
| 2,337,551 | 12/1943 | Hansgirg | 75/41 |
| 2,781,862 | 2/1957 | Fussman | 55/68 |
| 3,458,307 | 7/1969 | Marshall et al. | 75/42 |
| 3,615,355 | 10/1971 | Skinner | 260/449.5 |
| 3,816,101 | 6/1974 | Beggs et al. | 75/35 |
| 3,872,025 | 5/1972 | Singleton | 423/359 |

*Primary Examiner*—M. J. Andrews

[57] ABSTRACT

A process for the simultaneous production of synthesis and methanol or ammonia in which a modified blast furnace or vertical shaft furnace using iron ore and coke, or coal, is blown with oxygen or an oxygen-air mixture containing carbon dioxide to provide a top gas comprising essentially carbon monoxide which is at least partly shifted with steam to make hydrogen and carbon dioxide, which carbon dioxide is removed by compression and a solvent based carbon dioxide removal process, and the remaining gas stream is heated and passed through a systhesis reactor so constructed to recover heat from the synthesis reaction.

2 Claims, No Drawings

COPRODUCTION OF IRON WITH METHANOL AND AMMONIA

This invention relates to the production of methanol and ammonia from carbon monoxide of a furnace for then using oxygen and carbon dioxide instead of air, wherein the top gas is shifted wholly or in part with steam to hydrogen and carbon dioxide, the latter removed by a solvent process and the subsequent hydrogenation conducted in an apparatus enabling heat recovery.

The production of methanol and ammonia have long been based on natural gas, in essence reforming the natural gas with steam in a high temperature furnace known as a reformer, air being added for ammonia, and the resulting treated gas stream passed over a hydrogenation catalyst. Thus in the production of methanol, a mixture of hydrogen and carbon monoxide from the reformer in the desired ratio is passed over a catalyst, usually containing copper, to yield methanol in reasonable conversion. As considerable heat is generated in the process, several means of control have been established in the commercial facilities. In one process the heat is quenched by the addition of water, or low temperature steam. But in this case, no significant amount of heat can be recovered and further, water must be separated from the product methanol. In the production of ammonia, the addition of air to the reformer provides a source of nitrogen and creates some heat. The reformer off-gas is essentially a mixture of hydrogen, nitrogen and carbon dioxide, the last is removed leaving a 3:1 mole ratio mixture hydrogen-nitrogen which is passed over an iron containing catalyst, again the reaction is exothermic.

With the decreasing availability of natural gas accompanied by increasing prices, new raw materials are under investigation. Coal is thought of as such a raw material, but reforming coal is very difficult. Further, in combustion, pure oxygen, or at least oxygen in a higher concentration than in air, must be used for methanol and ammonia respectively. Since in any case a large quantity of oxygen must be used, the economics are unattractive, especially when compared to cheap natural gas.

Therefore, it is an object of my invention to provide an improved process for the production of ammonia.

It is another object to provide an improved process for the production of methanol.

It is a further object to provide a new process for the simultaneous production of methanol and iron.

It is yet another object to provide a new process for the simultaneous production of ammonia.

My invention is a process for the simultaneous production of iron and methanol or ammonia wherein iron is produced in a modified blast furnace oxygen or oxygen-air mixtures containing carbon dioxide to provide a top gas which is partly or totally shifted with steam, the carbon dioxide compressed out, optionally using a solvent removal process, and the remaining gas mixture passed through a shell and tube reactor to produce recoverable heat in addition to product.

I have discovered that methanol and ammonia can be produced from top gas of a blast furnace which has been converted to operate using oxygen, or oxygen-air mixtures, and carbon dioxide instead of air. But in the production of methanol or ammonia from the top gas it is critical to remove carbon dioxide by at least simple compression, but ideally using a solvent carbon dioxide removal process. Further, it is also critical that the heat of reaction of hydrogen with carbon monoxide or hydrogen with ammonia be recovered, necessitating the use of a shell and tube reactor. These factors are so critical as to make the difference between a practical process and uneconomic process.

A number of proposals have been made to produce iron or steel in a vertical furnace, in essence of modified blast furnace, using coke but replacing the hot air blast of the conventional blast furnace with mixtures containing oxygen in concentrations higher than is found in air. This is not intended to refer to oxygen enrichment as that has practically no effect on the composition of the resulting top gas. While the top gas from present blast furnaces varies considerable, a typical analysis is 55% $N_2$, 25% CO and 20% $CO_2$.

Clearly top gas from a conventional blast furnace is unsuitable for the production of either methanol or ammonia. A simple analysis tends to emphasize the fact, by removing the carbon dioxide a mixture of 70% $N_2$-30% CO is obtained, corresponding roughly to CO·2 $N_2$ which totally shifted with steam gives a mixture of $H_2$ and $N_2$ in the same 1:2 mole ratio which is far away from the desired 3:1 $H_2$:$N_2$ ratio. Likewise it is clear that the high nitrogen concentration, i.e., 70% will not allow a hydrogen-carbon monoxide mixture in sufficient concentration for methanol synthesis.

Thus Coutant in U.S. Pat. No. 2,715,575 disclosed a process for the operation of a modified blast furnace wherein a portion of top gas is recycled with moisture added and optional partial combustion oxygen, to be forced into the furnace through separate tuyeres from the oxygen used in the combustion of the coke descending from the top of the stack as in a typical blast furnace. The resulting top gas contains mainly carbon monoxide, but also significant concentrations of carbon dioxide and hydrogen. This gas would clearly be useful in the production of methanol or ammonia. Sellers in U.S. Pat. No. 2,790,711 also withdraws a portion of the top gas, passes it through a generator to convert the contained carbon dioxide and steam back to carbon monoxide and hydrogen before again forcing it into the bottom of the furnace through separate tuyeres from the pure oxygen which again reacts with the coke. Clearly this top gas would be useful in either the production of methanol or ammonia. A very similar scheme is reported by Voskoboinikov et als, Stahl 1970 (April), 290-3, where they used a reformer gas through tuyeres separate from the tuyeres used for blowing in pure oxyge. Again this top gas would be suitable as a starting material for the production of either methanol or ammonia.

Thus an evaluation was conducted using typical process known in the art. Whether methanol or ammonia is produced entails essentially the same considerations. First the washed top gas is compressed, heated and passed in part or totally through a shift reactor with a controlled amount of steam, ideally using a catalyst having a tolerance for sulfur compounds, i.e., carbonyl sulfide and hydrogen sulfide. The difference in the top gas for methanol and ammonia lies in the fact that in operating an iron furnace for the top gas for the latter, a controlled amount of air is added with the oxygen to provide the nitrogen needed, in other words about 0.4 tons air to supplement the 0.4 tons of oxygen used. Clearly in the production of a gas suitable for methanol, two-thirds of the contained top gas carbon monoxide is reacted with steam. This can be achieved in two ways, first two-thirds of the top gas can be passed into a shift reactor with steam to total conversion, the other third by-passing the converter. Alternatively the whole of the gas can be combined with the appropriate amount of steam and passed through the converter to roughly 67% conversion. Naturally the hydrogen present in the top gas must be taken into account. It should also be noted that the system of compressors and shift convertor is replacing the expensive reformer of the natural gas based methanol and ammonia processes.

The gas from the convertor, and by-pass if used, is cooled and carbon dioxide, other acid gases, and water are removed. For some reason in the United States carbon dioxide removal using an ethanol amine or potassium carbonate system has long been favored. However, these processes involve the forming of a chemical bond between the carbon dioxide and the removal agent. But once formed, breaking the bond for the freeing of the carbon dioxide once separated necessitates the use of a great amount of energy. While for a methanol process one can simply compress out most of the carbon dioxide so that the product could be made, simple compression cannot remove all the sulfur compounds which would rapidly poison the methanol synthesis catalyst if allowed to pass through. Thus it has been found that the ideal process for the removal or all the undesirable compounds is that using methanol as a solvent. Acetone, methyl formate, aother organic compounds, and even water may alternatively be used as a carbon dioxide, etc. removal solvent. The operation of a carbon dioxide process using methanol can be operated on a small fraction of the energy required for chemical bond carbon dioxide removal systems. It should be noted that in producing methanol or ammonia from a top gas of 80% CO-20% $CO_2$ some 1.4 and 2.0 tons of carbon dioxide are associated with each ton of carbon monoxide in the top gas. In other words some 4.2 tons of carbon dioxide are going to be produced with each ton of methanol and 5 tons of carbon dioxide will have to be removed for each ton of ammonia made.

The removal of the carbon dioxide by whatever process necessitates cooling the gas stream. It must be reheated and passed through a methanol or ammonia synthesis unit. In the past these units have been quite similar, only the catalyst differing greatly. But again in the first analysis, the most popular methanol process was evaluated and found technically satisfactory. In it the great amount of heat generated from the reaction of hydrogen with carbon monoxide was controlled by adding a quenching media, water or low temperature steam, but which did not allow the recovery of any of the generated heat, and in addition necessitated subsequent separation of the water from the product methanol. Because complete conversion is not approached in the process, a considerable portion of the gas must be stripped of water and methanol before recycle, necessitating even more energy.

As ammonia synthesis differs only in catalyst, the same problems exist in its production as exists in methanol production. In either case, relatively large amounts of energy are required in (a) compressing the top to the pressures required, upwards of thirty atmospheres and (b) operation of the carbon dioxide removal system.

Fortuitously it was discovered that the heat of the systhesis reaction could be recovered by using of a shell and tube synthesis reactor whence low temperature steam used in cooling and controlling the reaction heat was upgraded to high temperature steam useful in supplying energy to both the compression and carbon dioxide removal systems. Only a modest amount of external energy need be supplied to either the methanol or ammonia process of my invention.

According to the provision of the patent statutes, I have explained the principle of my invention and have illustrated and described what I now consider to represent its best embodiment. However, I desire to have it understood that within the scope of the appended claims, the invention may be practiced otherwise than as specifically illustrated and described.

I claim:

1. A process for the production of ferrous metal and methanol comprising,
   a. operating a ferrous blast furnace using a carbonaceous fuel and combusted with a gas containing oxygen and carbon dioxide to produce ferrous metal and top gas containing carbon monoxide and carbon dioxide,
   b. shifting the top gas from said ferrous blast furnace with steam to convert at least a part of the contained carbon monoxide to a gas containing carbon monoxide, carbon dioxide and hydrogen,
   c. removing carbon dioxide from the shifted gas by a solvent based carbon dioxide removal process to produce a synthesis gas containing hydrogen, carbon monoxide and carbon dioxide, reacting said synthesis gas in a hydrogenation reactor to produce methanol.

2. A process for the production of ferrous metal and ammonia comprising,
   a. operating a ferrous blast furnace using a carbonaceous fuel and combusted with a gas containing air and carbon dioxide to produce ferrous metal and top gas containing carbon monoxide, carbon dioxide and nitrogen,
   b. shifting the top gas from said ferrous furnace with steam to convert most of the contained carbon monoxide to a gas containing hydrogen, carbon dioxide and nitrogen,
   c. removing carbon dioxide from the shifted gas by a solvent based carbon dioxide removal process to produce a synthesis gas containing hydrogen and nitrogen,
   d. adjusting the ratio of hydrogen to nitrogen with the addition of nitrogen to provide a synthesis gas having a hydrogen to nitrogen ratio suitable for the production of ammonia,
   e. reacting said adjusted synthesis gas in a hydrogenation reactor to produce ammonia.

* * * * *